United States Patent
Lennhoff et al.

(10) Patent No.: US 6,233,038 B1
(45) Date of Patent: May 15, 2001

(54) IMAGING SYSTEM WITH INTEGRAL PUNCH MECHANISM

(75) Inventors: Akim Lennhoff, Cambridge; G. Bradley Mills, Westford; Philip A. Rombult, Bradford, all of MA (US); John D. Kennedy, Brentwood, NH (US); Edward C. Comeau, Bradford; Norman F. Rolfe, Carlisle, both of MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/039,529

(22) Filed: Mar. 16, 1998

Related U.S. Application Data

(63) Continuation-in-part of application No. 08/868,720, filed on Jun. 4, 1997.

(51) Int. Cl.[7] .............................. G03B 27/58; B41J 2/435; B65H 9/00
(52) U.S. Cl. .............................. 355/47; 347/262; 347/264; 271/226
(58) Field of Search ..................................... 347/262, 264; 355/47; 271/226

(56) References Cited

U.S. PATENT DOCUMENTS

| | | | |
|---|---|---|---|
| 5,655,452 | * 8/1997 | Blake et al. | 271/900 |
| 5,671,005 | * 9/1997 | Mc Nay et al. | 347/262 |
| 5,836,581 | * 11/1998 | Vernackt | 271/11 |
| 5,852,464 | * 12/1998 | Hebert | 347/215 |
| 5,889,547 | * 3/1999 | Rombult et al. | 347/262 |
| 5,909,237 | * 6/1999 | Kerr et al. | 347/262 |
| 5,953,807 | * 9/1999 | Garand | 347271/262 |
| 5,996,206 | * 12/1999 | Lynch et al. | 29/464 |
| 6,002,495 | * 12/1999 | Rombult et al. | 355/47 |

OTHER PUBLICATIONS

"Pin Registration: Making Sense Of the Formats and the Philosopy", The Seybold Report on Publishing Systems, pp. 12–18 Dec. 23, 1996.

* cited by examiner

Primary Examiner—Russell Adams
Assistant Examiner—Khaled Brown
(74) Attorney, Agent, or Firm—Alfred A. Stadnicki; Edward L. Kelley

(57) ABSTRACT

An imaging system is provided for imaging media of while supported at an imaging position on a support surfaces. The system includes a loading device configured to move the medium to be imaged along the support surface to the imaging position. During loading, the leading edge of the medium, which extends across the medium width and substantially perpendicular to a direction of movement of the medium, moves in a direction towards a registration device. A registration device is contacted by the leading edge of the medium during loading so as to position the medium in the imaging position on the support surface. A medium securing device secures the medium to the support surface and a perforation mechanism subsequently punches or notches the medium prior to imaging. A drive mechanism is provided to move the perforation mechanism and the registration device, typically prior to loading of the medium, to a position which corresponds to the particular width of the medium to be imaged.

25 Claims, 11 Drawing Sheets

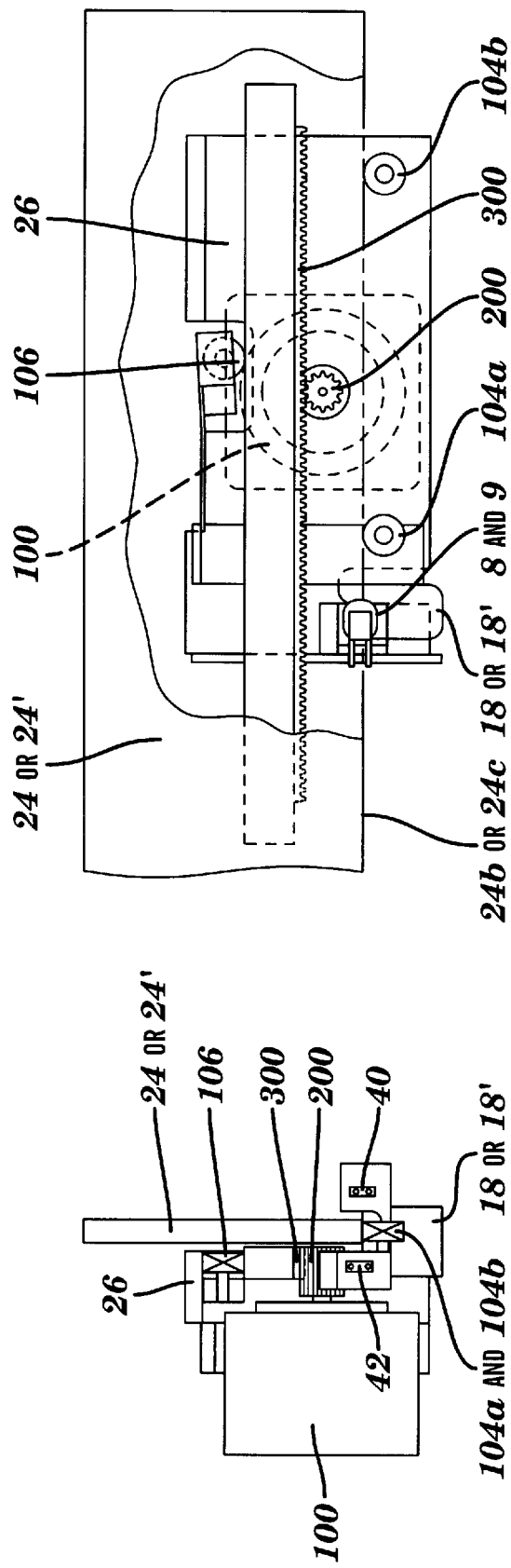

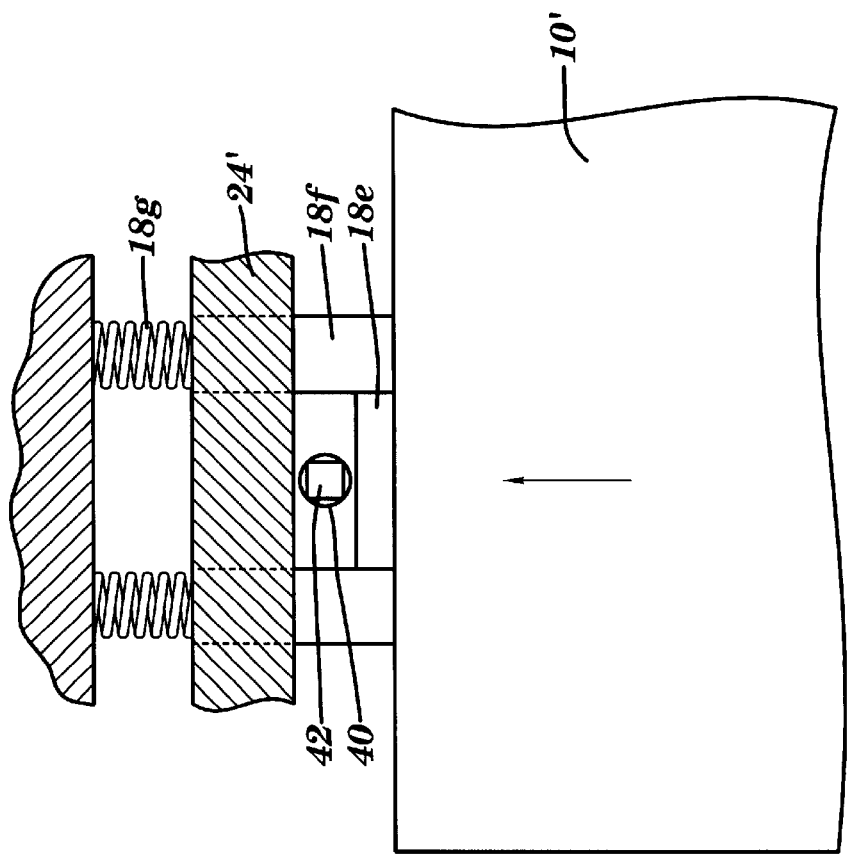
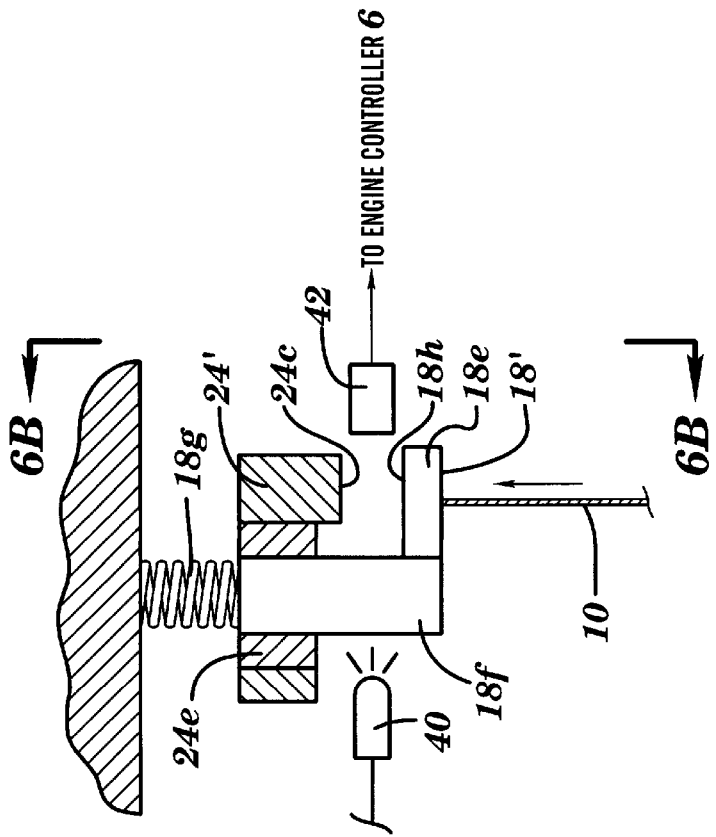
FIG. 6B
FIG. 6A

IMAGING SYSTEM WITH INTEGRAL PUNCH MECHANISM

RELATED APPLICATIONS

The present application is a continuation-in-part of copending U.S. application Ser. No. 08/868,720 filed Jun. 4, 1997 (Attorney Docket 3175-017/Client Reference XP-0618). The present application is related to copending U.S. application Ser. Nos. 08/868,970 (Attorney Docket 3175-018/Client Reference XP-0438) entitled "IMAGING SYSTEM WITH HIGH EFFICIENCY MEDIA LOADING", Ser. No. 08/868,969 (Attorney Docket 3175-023/Client Reference XP-0597) entitled "REGISTRATION DETECTION APPARATUS FOR IMAGING SYSTEMS", Ser. No. 08/867,129 (Attorney Docket XP-0473) entitled "A METHOD AND APPARATUS FOR SELECTIVELY DRAWING AIR FROM A PLURALITY OF VACUUM CHANNELS" and Ser. No. 08/868,526 (Attorney Docket XP-0474) entitled "METHOD AND APPARATUS FOR HOLDING RECORDING MEDIA ONTO A MEDIA SUPPORT SURFACE."

TECHNICAL FIELD

The present invention relates to imaging systems such as platesetters and imagesetters and more particularly to imaging systems with notchers or punchers.

BACKGROUND ART

Modern imagesetters and platesetters utilize optical scanners to write or record images for subsequent reproduction or to read a prerecorded image at a predefined resolution rate. Such scanners may write or record images on or read prerecorded images from various media including photo or thermal sensitive paper or polymer films, photo or thermal sensitive coatings or erasable imaging materials, an aluminum or other metal base printing plate, or other type media. The medium is typically mounted on an imaging surface which may be planar or curved and then scanned with an optical beam.

The primary components of modern imagesetting and platesetting systems include an image processor to generate and/or edit an image and a raster image processor (RIP) for converting data signals from the image processor into signals which can be understood by a controller which controls the imaging by the imagesetter or platesetter. The imagesetter or platesetter itself typically includes an imaging head such as a scan assembly which is often disposed and movable within a drum cylinder in which the recording or recorded medium is mounted. The controller, in accordance with the signals from the RIP and its own programmed instructions, generates signals to control the optical scanning so as to write images on or read images from the medium mounted within the drum cylinder by scanning one or more optical beams over the inside circumference of the drum cylinder while the cylinder itself remains fixed. A typical scan assembly of a cylindrical drum type image system may include a spin mirror or other optical device to direct the light beam over the inside circumference of the drum cylinder, as will be well understood by one skilled in the art.

In order to provide quality imaging, it is imperative that the medium to be imaged be properly positioned on the support surface of the imaging system. This is especially true in color imaging where color separations printed on separate sheets are subsequently superimposed on the printing press. Conventionally, registration pins, punches, visual targets or notches are utilized for this purpose. (See "Pin Registration: Making Sense Of the Formats and the Philosophy", The Seybold Report on Publishing Systems, pp. 12–18, Dec. 23, 1996.) In this regard, the applicable registration devices are fixedly mounted along the medium support surface in a predetermined configuration such that when the medium is loaded into the imaging system it is positioned against the registration pins, or punched or notched, i.e., perforated, while clamped or otherwise held in the imaging position. Although suitable for use in imaging systems which are intended to image only media of one width, or which will be used for imaging with only one punch or notch configuration, such fixed registration devices are less than ideal for use in imaging systems which are intended to image media of varying widths or which require a plurality of configurations to be used for a single image or media width.

Typically, it is assumed that the medium being loaded onto the support surface prior to imaging is properly positioned by forcing the medium to be imaged against the registration pins or by forcing the medium against the support surface and holding it in place. However, if the medium is being loaded in a skewed disposition, the medium may contact less than all the registration pins and therefore be skewed on the support surface at the time of imaging. By punching or notching the media while held in place against the support surface, this error can often be overcome.

In certain cases, it is necessary to notch or punch the medium subsequent to the imaging of a medium on an auxiliary machine. This provides greater flexibility in terms of the different configurations or widths which can be accommodated. The medium can then be mounted to the cylinders of the print processor using the notches or punches. In such cases, misregistration errors can occur during the punching or notching operation due to an accumulation of tolerances during each operation, since each operation for imaging, punching and printing requires registration for optimal image quality.

Punches and notches may take any desired shape, circles and slots, or portions thereof, being the most common shapes. Different configurations may also require different punch or notch sizes and/or placements. Additionally, certain configurations may require varying size or shape punches or notches and/or a combination of punches and notches. Conventional fixed configuration notches and punches make it difficult to accommodate such special requirements.

Another problem with a fixed punch configuration is that the leading left edge of the medium must be justified against a stop in order to properly align the punches with the image. Hence, the medium must be moved perpendicular to the load direction to properly align the punches with the image.

OBJECTIVES OF THE INVENTION

It is therefore an object of the present invention to provide an imaging system capable of properly punching or notching media of differing widths.

It is another object of the present invention to punch or notch media at any location along the media edge so that a plurality of press punch/notch configurations can be accommodated.

It is a further object of the present invention to provide an imaging system which will accurately punch or notch media of differing widths on the medium support prior to imaging.

Additional objects, advantages and novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the invention, an imaging system, such as an imagesetter or platesetter, is provided for imaging media. The media may be metallic or non-metallic, i.e may or may not be electrically conductive. The system includes a loading device for moving the medium to be imaged, typically leading edge first, along a planar or curved medium support surface, e.g. an internal surface of a cylindrical drum, to a desired imaging position. The leading edge of the medium extends across the medium width and substantially perpendicular to the direction of movement of the medium during loading.

One or more registration devices, for example a pin(s), are preferably provided. To properly position the medium in the imaging position on the support surface, the leading edge of the medium contacts the registration device(s) during loading. A drive mechanism can be provided to move the registration device(s) so as to be positioned to correspond to the width or some other dimension of the medium to be imaged. The imaging system can thereby properly position media of differing widths on the imaging support surface. For example, if the support surface is the internal surface of a cylindrical drum, the drive mechanism preferably moves the registration device(s) substantially parallel to the longitudinal axis of the cylindrical drum to appropriate locations to ensure contact with the leading edge of the medium to be loaded.

A perforation mechanism(s), such as a puncher or notcher, is provided on the drive mechanism to allow for perforating, e.g., punching or notching, of the medium to be imaged while supported, and beneficially properly positioned, on the support surface. Advantageously, the drive mechanism moves the perforation mechanism(s) conjunctively and simultaneously with the registration device(s) to correspond to the width or another dimension, i.e., to a size parameter, of the medium to be imaged or to a desired perforation configuration, e.g. a particular configuration of punches and/or notches. When the indication of proper alignment of the medium is provided, a medium securing device, preferably of a vacuum type system or alternatively a mechanical clamping mechanism, secures the medium in the proper imaging position. Subsequently, the perforation mechanism is actuated to accurately create a perforation in the medium at the desired position or multiple perforations at the desired positions. Beneficially, the registration device(s) and the perforation mechanism(s) can be mounted conjunctively and in a fixed spacial relationship on the drive mechanism(s), which moves in response to selection of a particular media size to be imaged or desired perforation configuration(s), providing both registration and punching/notching capabilities for varying size media and/or in any of multiple configurations.

BRIEF DESCRIPTION OF DRAWINGS

FIG. 4A is a side view of the movement assembly 26 of FIG. 3A.

FIG. 4B is a front view of the movement assembly shown in FIG. 4A.

FIG. 6A details a second configuration of the registration pin and registration bar depicted in FIG. 1.

FIG. 6B is another view of the pin and registration bar of FIG. 6A.

BEST MODE FOR CARRYING OUT THE INVENTION

Figure 1:
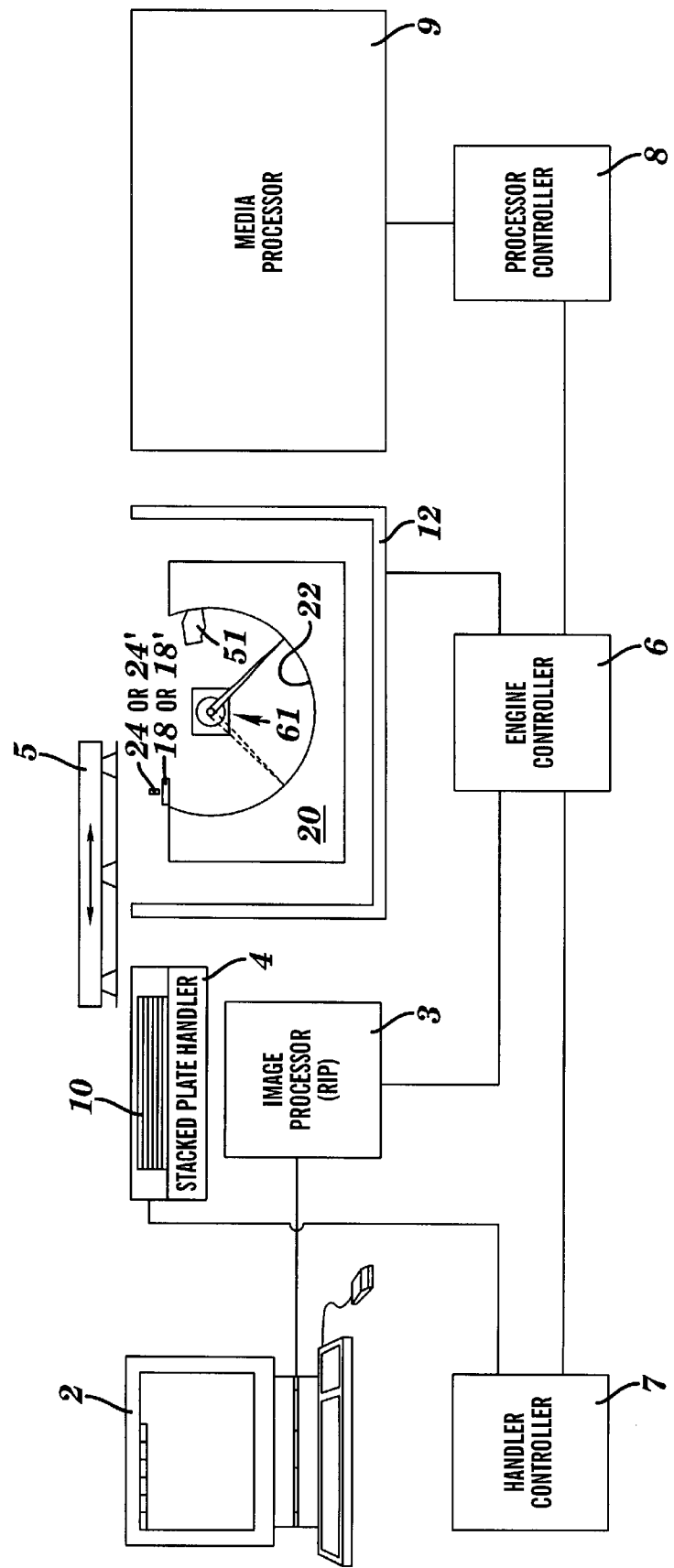
FIG. 1 depicts an imaging system in accordance with the present invention.

FIG. 1 depicts an imaging system in accordance with the present invention. As shown, the imaging system includes a computer 2 which may be a personal computer, a workstation, or virtually any type of computing device and may form part of an operator control panel. The computer 2 allows images to be created or edited and serves as a general input device. For example, the computer 2 can be utilized to select a particular scanning resolution to be used in imaging during a particular operational sequence.

The imaging system further includes a stacked plate handler 4 which is controlled by the handler controller 7. The stacked plate handler 4 stores media 10 of various sizes in different cassettes, as will be described further below. The computer 2 can be utilized by the system operator to input commands identifying the desired plate size. The computer 2 will then generate a signal, responsive to which the handler controller 7 controls the handler 4 such that plates from the applicable cassette within the handler 4 are made accessible to a plate picker 5. The plate picker 5 removes a plate from the handler 4 and conveys the plate to the loading device or applicator 50 of the scan engine 12 which is controlled by engine controller 6.

Images are transmitted from the computer 2 to the raster image processor (RIP) 3 which converts the digitized signals received from the computer 2 into signals which can be understood by the engine controller 6 which controls the scan engine 12. The scan engine 12 includes the plate picker 5 which operates in conjunction with the stacked plate handler 4 and the applicator 50 to move individual plates from the handler 4 to the applicator 50 for loading.

Once the plate has been loaded onto the mounting surface 22 of the cylindrical drum 20, it is scanned by a scanning light beam radiating from moving scan assembly 60 in accordance with the instructions from the engine controller 6 responsive to the signals received from the RIP 3. As indicated in FIG. 1, the scan engine 12 includes registration pins 18 or 18' and registration bar 24 or 24' which are utilized to properly position the medium on the support surface 22 of the cylindrical drum 20 during loading. The medium, once properly positioned in the imaging position, is maintained in position and punched or notched for subsequent registration onto a press cylinder using the leading edge of the plate for registration. Registration means provided on the press cylinder would be located at substantially the same location.

In accordance with other aspects of the invention, a guide mechanism is connected to each registration device to guide its movement in the direction of movement of the medium as it is pushed by the leading edge of the medium. That is, when the leading edge of the medium contacts each registration device during loading, it applies a force to move the registration device in the same direction as the medium. A registration bar is provided to restrain the movement of each registration device once it reaches a point of contact with the registration bar. This ensures proper alignment registration of the medium as it is loaded onto the imaging support surface. Typically, the registration device(s) each have a contact surface of making contact with a contact surface of the registration bar. Advantageously, the drive mechanism contacts the contact surface of the registration bar to thereby provide a fixed relative positioning of each registration device and the registration bar.

Preferably, multiple registration devices are provided. For example if two registration devices are provided, each is beneficially positioned proximate to a respective end of the leading edge of the medium being loaded. The positioning is generally set as desired for the particular implementation as will be understood by those skilled in the art. One of the registration devices may be fixed. The leading edge of the medium will typically contact both registration devices during loading. The imaging will begin at a predefined distance from the registration devices and parallel to the registration bar. The applicable guide mechanism will guide the movement of one registration device until it too moves to positions as the registration pins of the imaging system. These registration means could be similar to the registration pins 18 or 18' and registration bar 24 or 24'.

The image is then recorded by scanning the light beam parallel to the registration bar 24 or 24'. Recorded media is then transferred to the media processor 9 which is controlled by the processor controller 8 in accordance with signals received from the RIP 3 to develop or otherwise process the imaged plate. The processed plate is then removed from the system.

Figure 2:
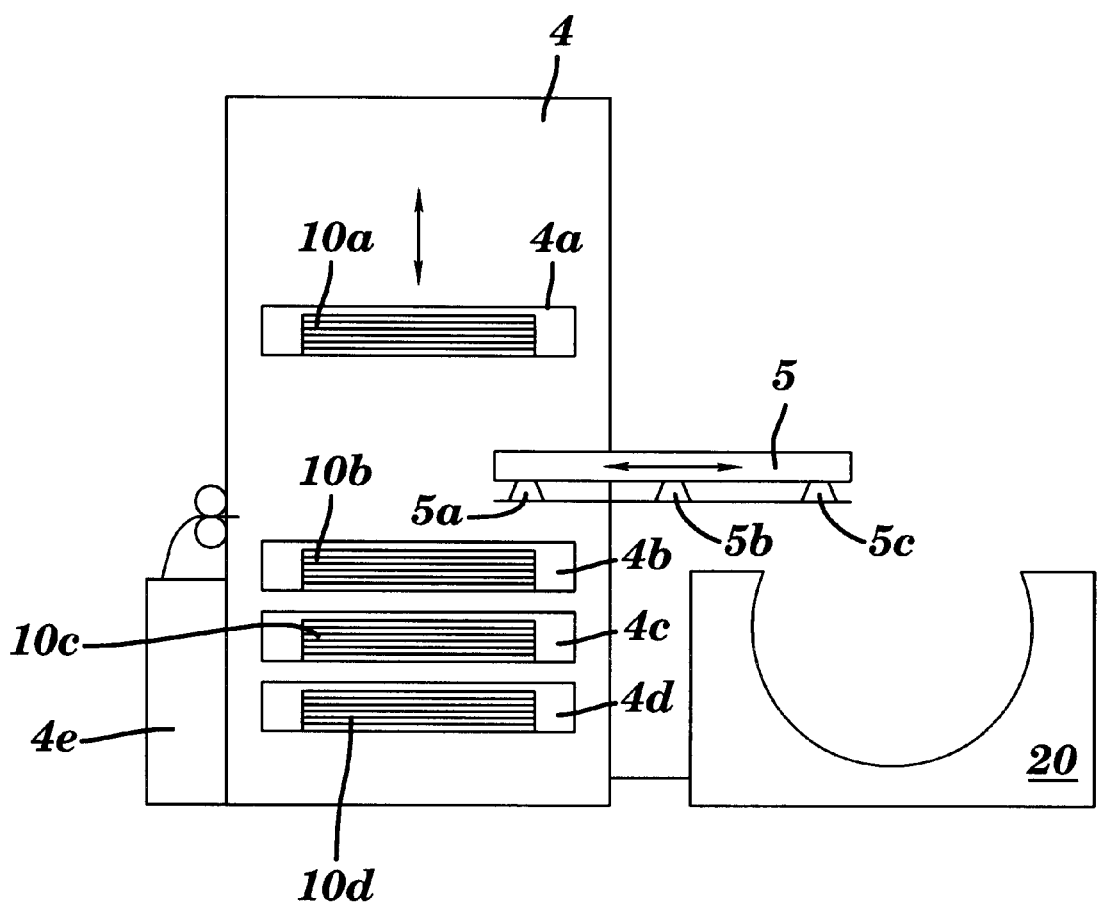
FIG. 2 further details the stacked plate handler depicted in FIG. 1.

FIG. 2 provides a more detailed depiction of the handler 4 and individual media cassettes 4a–d. The handler 4 also includes slip sheet remover 4e for removing slip sheets between plates stacked within each cassette. As indicated, the cassettes are movable vertically to position a desired cassette below the plate picker 5 to provide a plate of a selected size. The plate picker 5, using suction devices 5a–5c, lifts the plate from the handler cassette 4b, as shown, and then conveys the individual plate to the applicator 50 of FIG. 1 for loading into the cylindrical drum 20. As shown in FIG. 2, each of the cassettes 4a–4d stores a different sized plate. The plates in the respective cassettes have different widths. The width, as used herein, is intended to refer to the dimension which, when the plate is loaded onto the support surface of the internal drum, is measured in a direction parallel to the longitudinal axis of the drum, as will be discussed in more detail below.

Hence, the system operator can identify a desired plate size using the computer 2 by, for example, selecting one of multiple plate sizes displayed on a monitor of the computer 2, or inputting a desired plate size or cassette number representing the cassette in which plates of the desired size are stored, to generate a signal to the RIP 3. The signal is transformed by the RIP 3 into an appropriate signal to the handler controller 7. The controller 7 controls the handler 4 in the manner previously described such that plates of the desired size can be conveyed by the plate picker 5 to the applicator 50 of the engine 12.

Figure 3A:
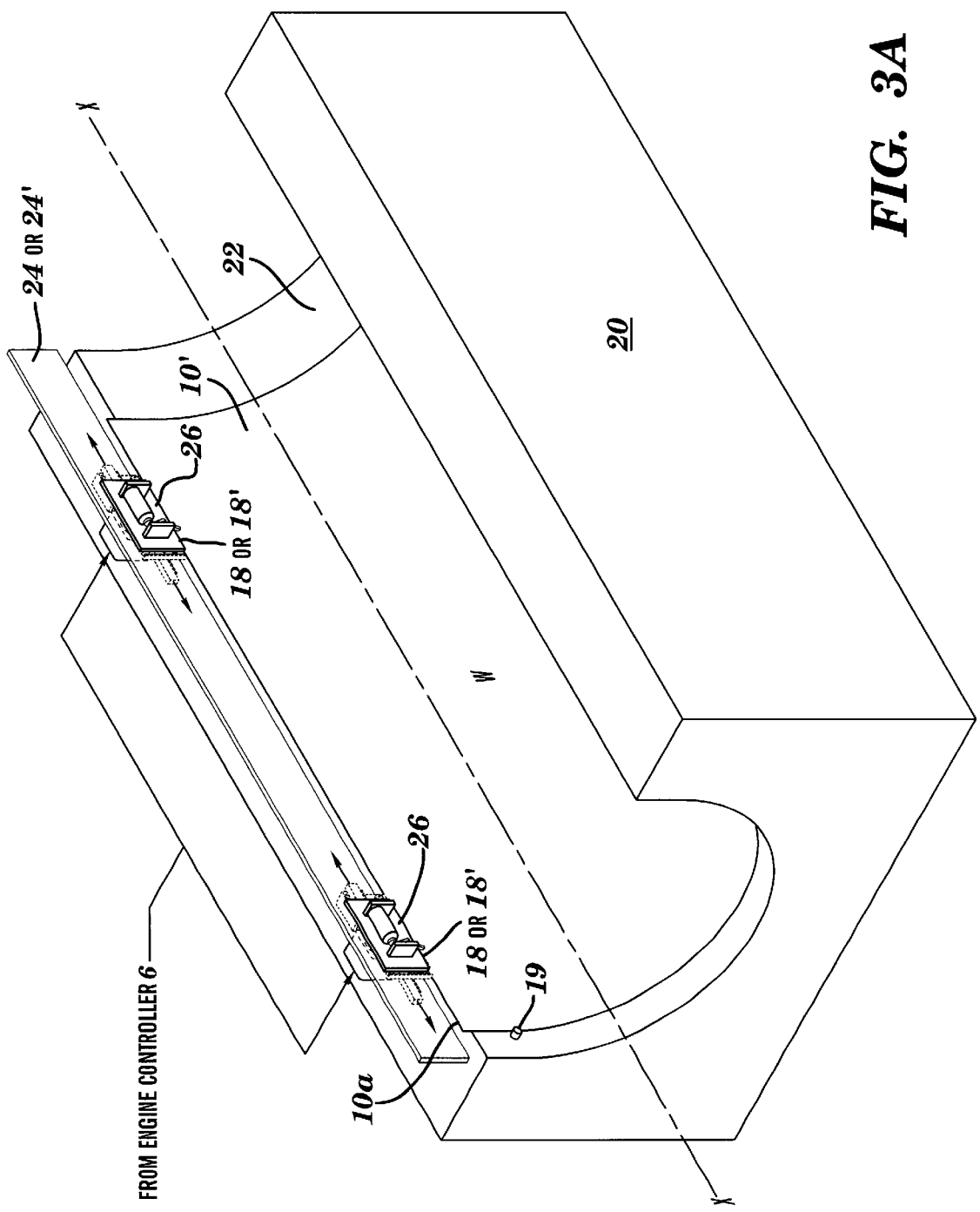
FIG. 3A depicts a registration assembly including the registration pin and registration bar depicted in FIG. 1.
Figure 3B:
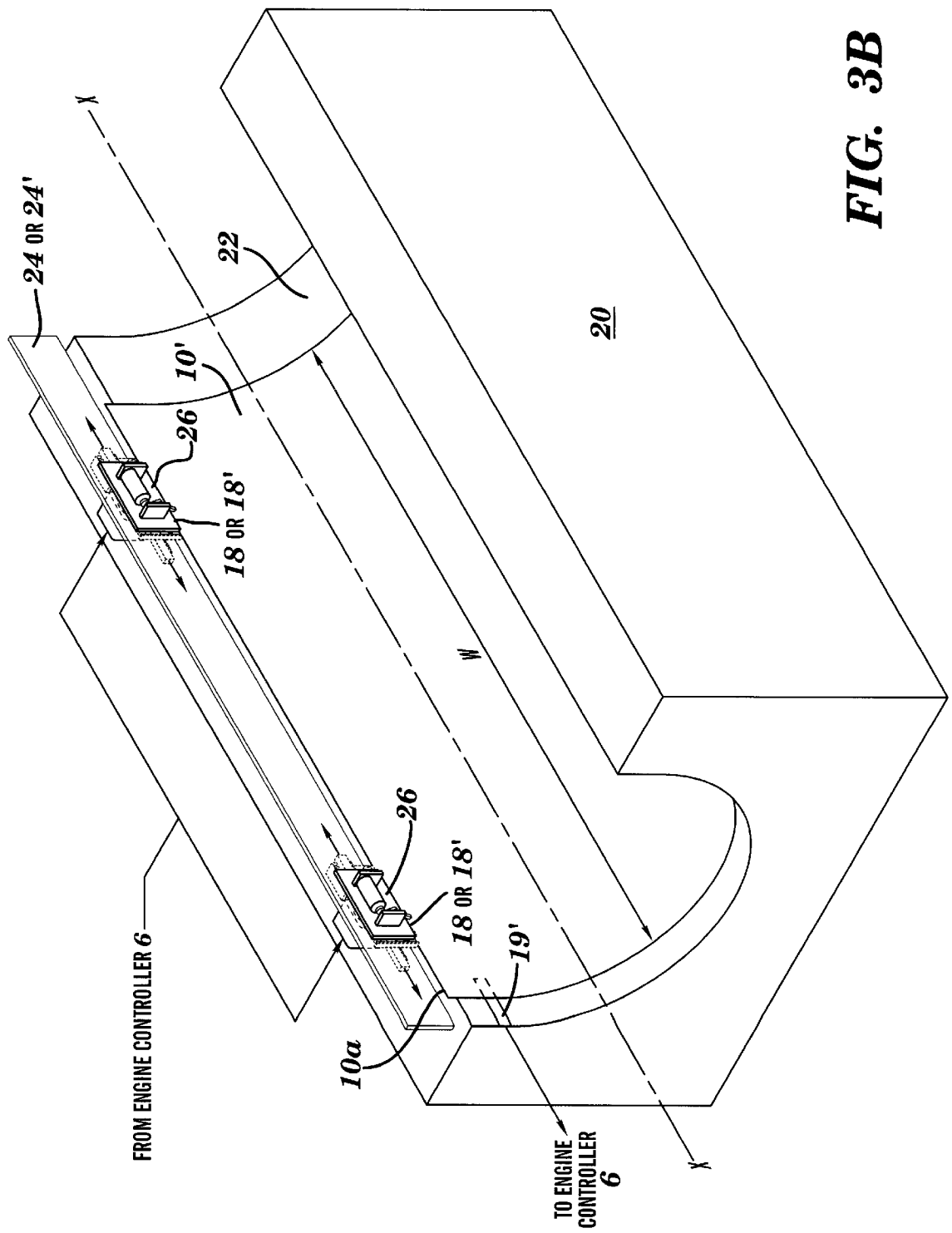
FIG. 3B is similar to FIG. 3A but with an edge detector substituted for the left edge registration pin.

FIG. 3A depicts the cylindrical drum 20 with a sheet of medium 10' loaded therein. The medium 10' has a width W measured parallel to the longitudinal axis X—X of the cylindrical drum 20. The medium 10' is loaded such that the leading edge 10a of the medium 10' contacts the registration pins 18 or 18' which, as will be detailed further below, are thereby moved into contact with the registration bar 24 or 24'. The medium is left justified at a desired position either against a registration pin 19 or using an edge detector assembly 19' shown in FIG. 3B. If a left edge registration pin 19 is utilized, it may be preferable to fix the left side registration pin 18 or 18' with respect to the registration bar 24 or 24'. On the other hand, if an edge detector 19' is used, it will be preferable to have both registration pins 18 and 18' adjustable. As shown in FIG. 3B, the left edge detector 19' is a large area light detector which is recessed in the drum 20. The detector 19' detects light from the scanning light beam over the portion of the detector now covered by the plate. The detector 19' generates a signal representing the location of the edge of the plate on the detector. The signal is transmitted to the controller 6 which, on the basis of the identified location of the side edge of the plate, begins imaging a predefined number of scan lines from the edge.

A movable drive assembly 26 attaches the registration pins 18 or 18' to the registration bar 24 or 24'. In accordance with signals received from the engine controller, the drive assembly moves the registration pins 18 or 18' parallel with the axis X—X of the cylindrical drum 20 to adjust the positioning of the registration pins 18 or 18' on the registration bar 24 or 24' in accordance with the plate size identified on the computer 2 or the designed punch configuration. Accordingly, as indicated by the two-headed arrows at each of the drive assemblies 26, each drive assembly 26 can be moved further towards or away from the respective ends of the registration bar 24 or 24', depending upon the selected plate size, to move each of the pins 18 or 18' to a position corresponding to the width of the plate to be imaged. Note one drive assembly 26 could be fixed while the other moves, or a single drive assembly could be moved to punch all holes.

FIGS. 4A and 4B detail the moveable assembly 26. FIG. 4A depicts a side view of the movement assembly. As shown, the assembly includes a stepper motor 100 which drives a gear 200. The gear 200 engages a rack 300 to drive the assembly 26 along the registration bar 24 or 24'. Ball bearings 104a and 104b ride along the bottom surface 105 of the registration bar 26. The ball bearings 104a and 104b are preloaded against the bottom surface 105 of the registration bar 24 or 24' due to the action of a preload bearing 106 which rides along the top surface of the rack 300. It should be noted that the rack 300 is shown to extend only along a portion of the registration bar but could if desired extend along the full length of the registration bar 24 or 24' to provide the greatest flexibility in locating the registration pins. As the stepper motor turns, the gear 200 rotates and propels the assembly 26 along the longitudinal axis of registration bar 24 or 24', which is aligned parallel to the longitudinal axis of the drum 20. Since the bearings 104a and 104b ride along the same lower surface 24b or 24c of the registration bar 24 or 24' which the registration pin 18 or 18' contacts as the register reference, the alignment of the registration pin 18 or 18' with respect to the registration bar contact surface 24b or 24c is guaranteed. As shown, a light-emitting diode 40 and photodetector 42 can be used, as will be detailed further below, to determine when the registration pin contacts the registration surface. Alternatively, the pin and bar can be arranged in a current detection circuit, as will be described further below.

Figure 5:
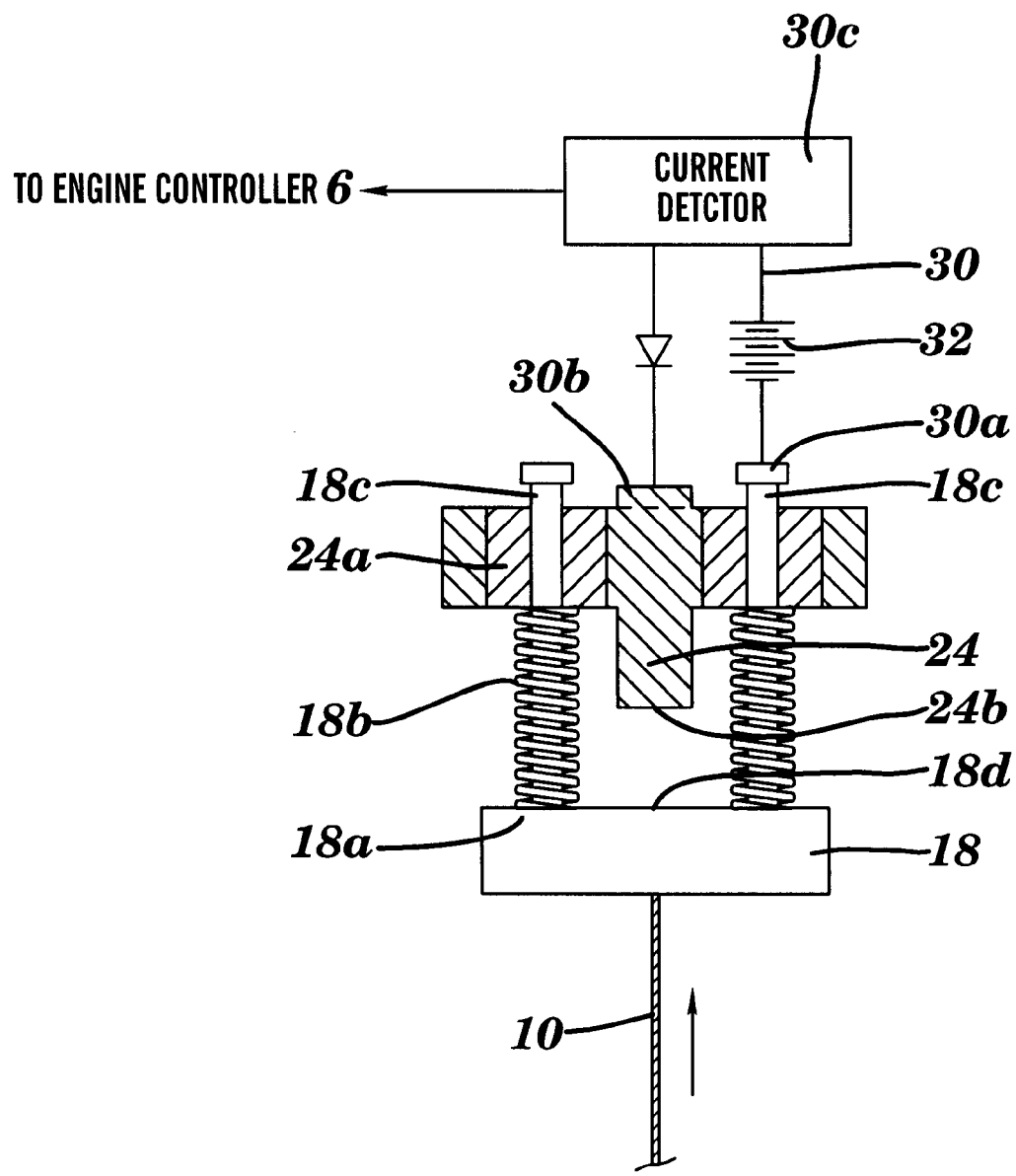
FIG. 5 details a first configuration of the registration pin and registration bar depicted in FIG. 1.

FIG. 5 depicts a first configuration of the registration pin 18 and registration bar 24 which provides information to the engine controller, and hence to the system operator, regarding the proper alignment of the loaded medium. As shown in FIG. 5, the sheet of medium 10' being loaded onto the support surface 22 of the cylindrical drum 20 makes contact with the registration pin member 18a which is spring mounted on slide pins 18c. The springs 18b have one end abutting the pin member 18a and a second end abutting the insulating bushings 24a which are installed in an elongated aperture formed along substantially the entire length of the registration bar 24.

The detector circuit 30 is connected to a power source 32, and by a connector 30a to one of the slide pins 18c of the registration pin 18 and by connector 30b to the registration bar 24. The detector circuit 30 also includes a current detector 30c which detects a current through the detection circuit 30 when the pin member 18a of the registration pin 18 contacts the registration bar 24. As indicated, this contact occurs when contact surface 18d of the pin member 18a makes contact with contact surface 24b of the registration bar 24.

Once contact is made, a current flows to the current detector 30c which generates a signal to the engine controller 6 indicative of the registration pin member 18a having moved to a point of contact with the registration bar 24. As will be further discussed below, the detection of the contact between the registration pin 18 and the registration bar 24 can be used to determine if the loaded plate 10' has been properly positioned within the cylindrical drum 20. It should be noted that, using the FIG. 5 configuration, contact will be determined even if the medium 10' is formed of a non-metallic material. Hence, an electrical circuit can still be utilized to detect the registration alignment of media on the mounting surface 22 even if the media is not electrically conductive.

FIG. 6A depicts an alternative configuration which can be used to ensure proper alignment of the medium 10' on the cylindrical drum mounting surface 22. As depicted, the registration pin 18' includes a registration pin member 18e and slide members 18f. The slide members 18f are mounted to springs 18g which are designed to allow movement of the pin member 18e towards and away from the contact surface 24c of the registration bar 24'. The slide pins 18f pass through an elongated aperture formed along substantially the full length of the registration bar 24' and are supported by a bushings 24e disposed therein.

A light emitting diode (LED) 40 is provided to emit a radiating light beam which passes between the registration pin member 18e and the register bar 24' when not in contact. The light is detected by the photodiode 42 which generates a signal to the engine controller 6 indicative of no contact between the registration pin 18' and registration bar 24'. This allows the engine controller 6, and accordingly the system operator, to determine if the medium 10' is properly positioned on the support surface 22 of the cylindrical drum 20 prior to imaging the medium.

As shown in FIG. 6B, the LED 40 and photodiode 42 are disposed between the slide pins 18f. As the plate 10' moves in the direction of the arrow, the leading edge of the plate 10' makes contact with the pin member 18e and pushes the pin 18' such that the slide members 18f force the springs 18g to be compressed and the contact surface 18h of the registration pin 18' to move toward the contact surface 24c of the registration bar 24'. When the contact surfaces 18h and 24c make contact, the light from the LED 40 is totally blocked such that the photodiode 42 ceases to detect the radiating light. The photodiode 42 therefore stops, generating a signal to the engine controller 6 thereby indicating to the engine controller 6, and hence to the system operator, that the media 10' is in proper registration at the applicable registration pin 18'.

Figure 7:
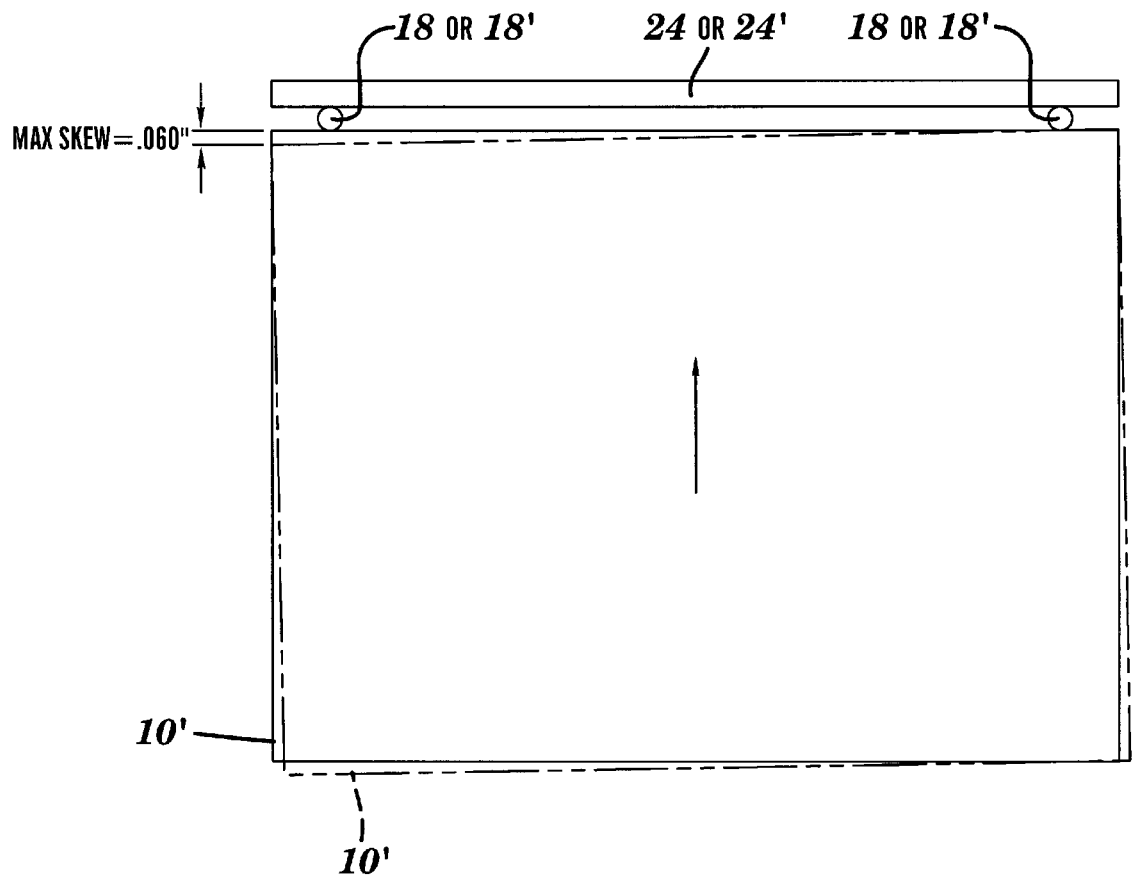
FIG. 7 depicts the medium deskewing movement after contacting the first registration pin.

FIG. 7 shows the movement of the sheet of medium 10' after contact between the first registration pin 18 or 18' positioned proximate to the right side of the plate 10' with the registration bar 24 or 24', while a second registration pin 18 or 18' proximate to the left side of the medium pin has yet to contact the registration bar 24 or 24', with the medium being moved in the direction indicated by the arrow. As shown, a skew of 0.060 inches exists at the left registration pin 18 or 18' when the right pin 18 or 18' contacts the registration bar 24 or 24'. Accordingly, at this point the media 10 is improperly positioned on the support surface 22 of the drum 20.

Because the engine controller 6 is aware that the left registration pin 18 or 18' has yet to contact the registration bar 24 or 24', the applicator 50 continues to move the plate 10' toward the registration bar 24 or 24'. The plate 10', although restricted from further movement toward the registration bar 24 or 24' on the right side of the plate, is able to slightly rotate about the right side registration pin 18 or 18'. This allows the left side of the plate 10' to continue to move, pushing the left side registration pin 18 or 18' up against the registration bar 24 or 24' and thereby eliminating the skew as indicated.

At this point, as discussed above, the engine controller 6 is made aware of both registration pins 18 or 18' being in register with the registration bar 24 or 24' and, accordingly, that the medium has been properly positioned for imaging on the support surface 22 of the drum 20. The engine controller thus processes a signal to indicate that positioning is complete. At this point, the medium can be punched or notched while maintaining the medium in proper registration in the imaging position, as described below.

Figure 8A:
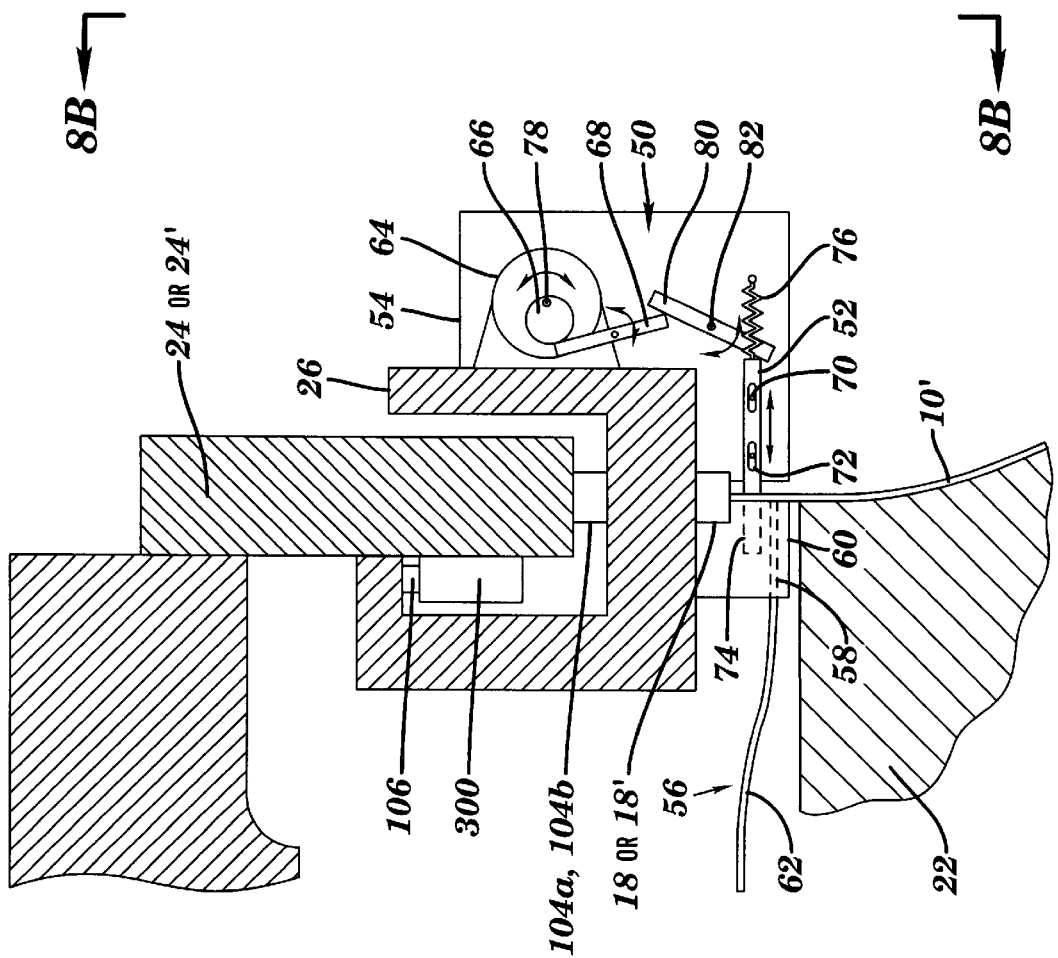
FIG. 8A depicts a punching/notching mechanism including the medium securing device and the punch/notch actuator in accordance with the present invention.

FIG. 8A depicts a punching and/or notching mechanism, indicated generally as 50, which is mounted on the movable assembly 26 to move in conjunction with the movement of the registration pins 18 or 18', as described previously herein. The punch/notch mechanism has a punch or notcher 52 which is accurately positioned relative to the registration bar 24 or 24', to provide accurate punches or notches in the medium 10' relative to the imaging position.

The mechanism 50 is supported by plates 54 mounted to the moveable assembly 26. The main components of the mechanism 50 are the medium securing device and the actuator. In the embodiment depicted in FIGS. 8A and 8B, the medium securing device is a vacuum system 56 which applies a vacuum in the area where the leading edge of the medium 10' is supported. The vacuum system 56 has a plurality of spaced vacuum ports 58 provided along a die 60, which is attached to the moveable assembly 26. The vacuum ports 58 are connected to a vacuum hose 62 which leads to a vacuum pump (not shown) via a manifold (not shown).

Figure 8B:
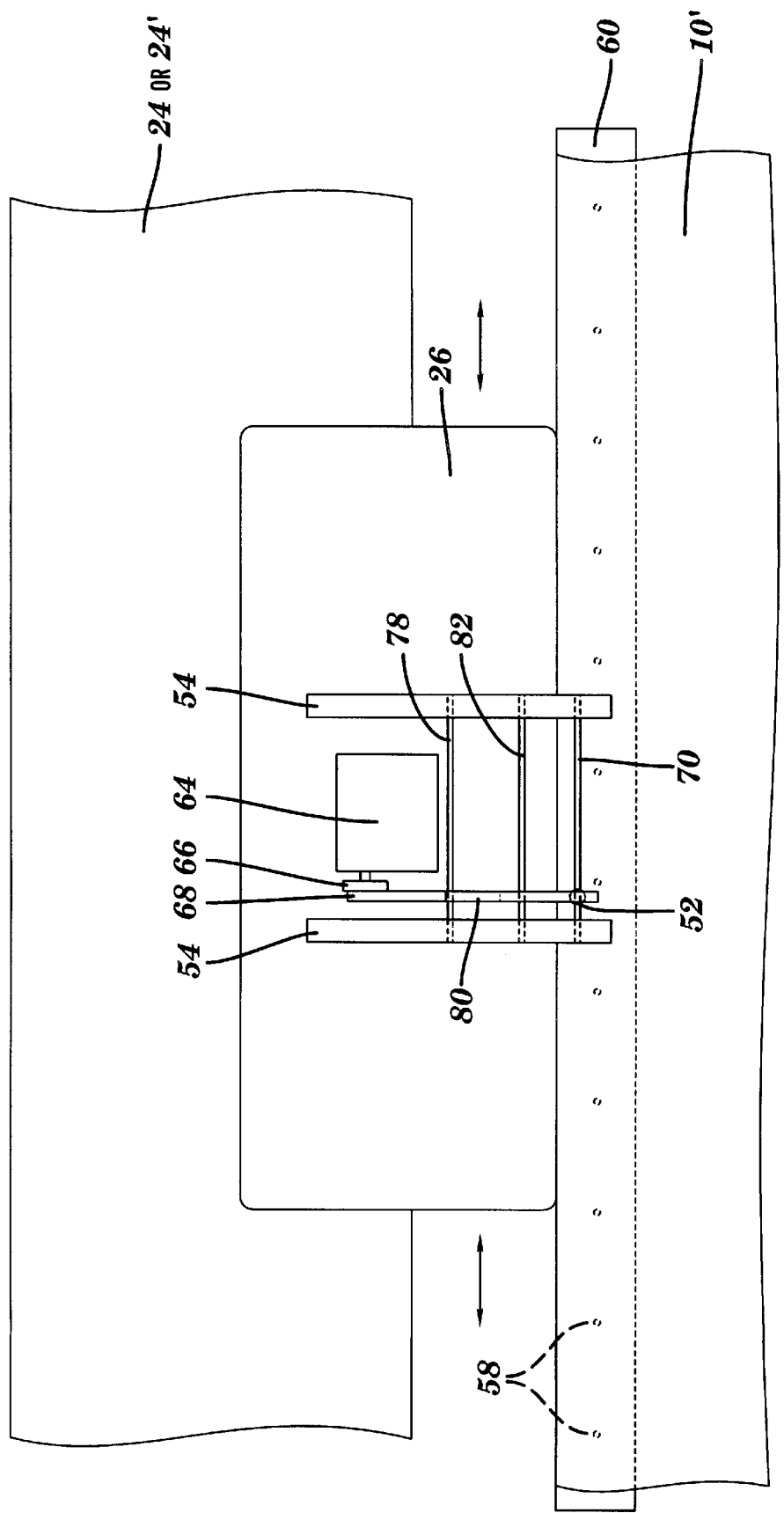
FIG. 8B is another view of the punching mechanism taken along line 8A—8A of FIG. 8A.

The vacuum ports 58 hold down and secure the leading edge area of the medium 10' to the die 60, which is positioned slightly above the top edge of the drum 22 so as to extend beyond the support surface provided in the drum, as depicted in FIG. 8B. As an alternative to the vacuum system 56, a mechanical clamping system for clamping down and securing the medium to the die could be employed.

The punch/notcher 52 actuator includes a motor 64 supported on the plates 54, and a cam pusher 66 and follower mechanism 68 which is driven by the motor and which actuates the motion of the punch/notcher 52. The punch/notcher is supported by two shafts 70 mounted on the plates 54 perpendicular to the direction of the punch/notcher movement which is indicated by the arrow shown in FIG. 8A. The two shafts 70 pass through oblong holes 72 in the punch/notcher 52. The oblong holes 72 allow for a reciprocating movement of the punch/notcher into a hole 74 provided in the die 60 for receiving the punch/notcher 52. A return spring 76 is provided between the punch/notcher and the plate 54 to retract the punch/notcher 52 from the hole 74 in the die and maintain the punch/notcher in the retracted position before and after punching or notching.

As best shown in FIG. 8A, rotation of the eccentrically mounted cam pusher 66 pivots the follower member 68 on a pivot shaft 78 which in turn pivots a second member 80 upon a second pivot shaft 82. The opposing end of the second member 80 abuts against an end of the punch/notcher 52 and during the pivot proceeds to push the punch/notcher in the direction of the die 60 against the force of the return spring 76 to perforate the medium 10'. The punch/notcher and die shapes can be of any desired shape for punching or notching the plate.

A mechanism 50 is provided on each of the two movable assemblies 26 to accommodate multiple plate sizes. In accordance with signals received from the engine controller, the drive assembly moves the movable assemblies 26 carrying the punches/notchers 52 and the registration pins 18 or 18', which are in a fixed relationship, to adjust the positioning of the punches/notchers 52 and the registration pins 18 or 18' in accordance with the plate size or a desired punch or notch configuration identified on the computer 2. Since each of the drive assemblies 26 can be moved further towards or away from the respective ends of the registration bar 24 or 24', depending upon the selected plate size and/or desired configuration, the punches/notchers 52 and the pins 18 or 18' are positioned corresponding to the width of the plate to be imaged and/or the desired perforation configuration. If desired, the perforators 52 could include one punch and one notch, or notches or punches of different sizes or shapes, thereby providing further flexibility in perforation configurations. The mechanism 50 can be operated such that multiple perforations are made by each perforator 52.

Subsequent to the proper registration, securing and punching/notching of the medium, the engine controller 6 is made aware that the medium is prepared for imaging and controls the scan assembly 60 to image the medium. The first scan line impinges upon the plate at the desired predefined position from the leading edge of the plate and parallel to the registration bar.

Figure 9:
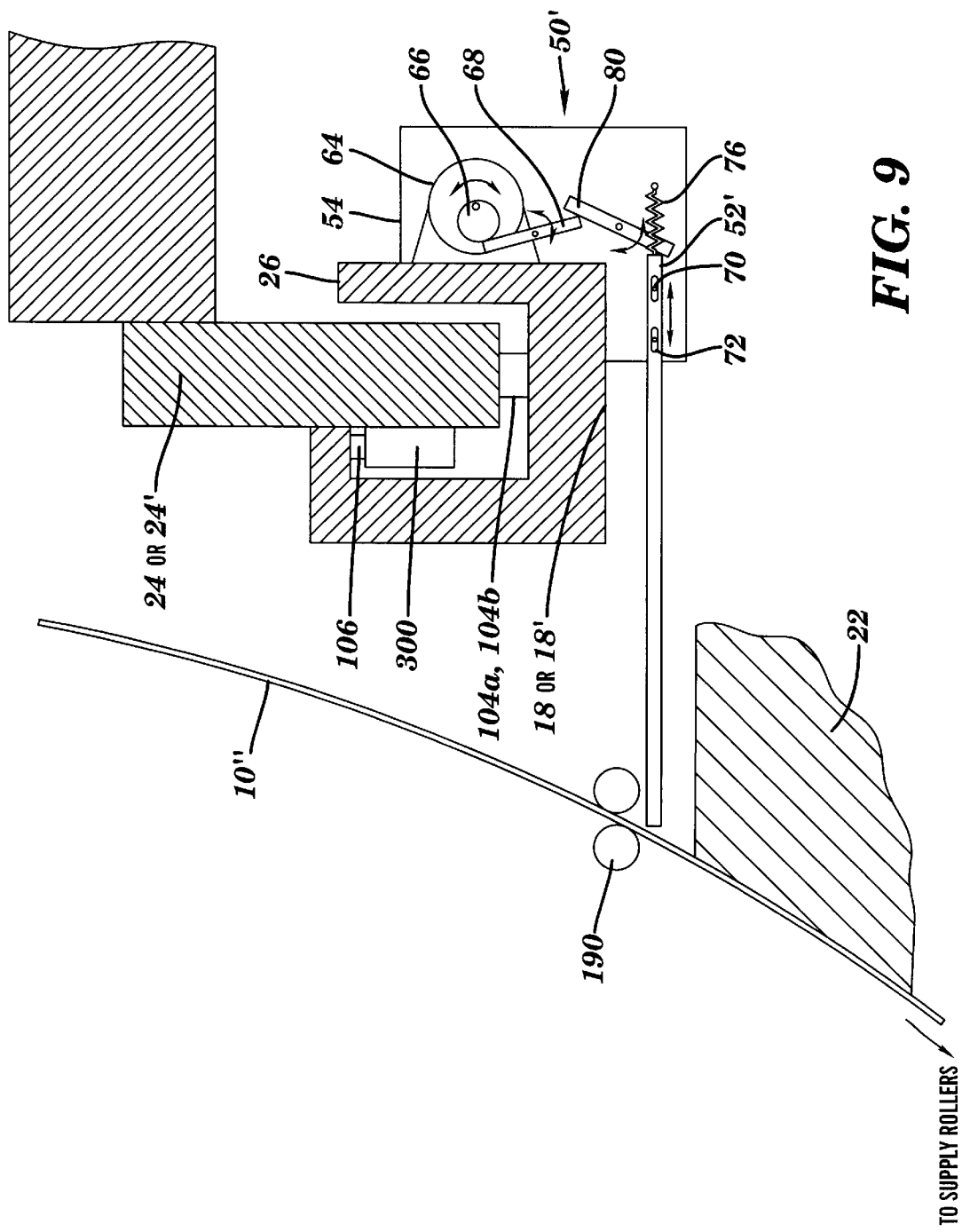
FIG. 9 depicts a punching/notching mechanism for webbed media in accordance with the present invention.

FIG. 9 depicts a punching/notching mechanism 50' which is suitable for use in perforating webbed media, i.e., a continuous roll of media as compared to multiple separate sheets of media. The mechanism 50' is similar to mechanism 50 of FIG. 8A, except as will be described below. It will be noted that like reference numerals have been used in FIG. 9 to identify components of mechanism 50' which are identical to components of mechanism 50.

As shown, webbed media 10" is loaded onto the drum cylinder 22 by supply rollers (not shown). The media 10" is fed through take-up rollers 190. The medium 10" may be held in place on the drum 22 by a vacuum (not shown) or clamps (not shown) as is understood in the art, or by reverse rolling the take-up rollers to force the media 10" against the drum between the supply rollers and take-up rollers. With the media 10" held against the drum 22, the mechanism 50' is operated as has been previously described with reference to mechanism 50 above to perforate the media in the desired manner. It will be recognized that registration pins for registering the leading edge of the media are unnecessary when webbed media is being imaged.

As described in detail above, the present invention provides an imaging system capable of properly positioning media of differing widths on a medium support surface prior to imaging. The system can ensure proper alignment registration of the medium to be imaged as it is loaded onto the medium support surface, whether or not the medium is electrically conductive. If necessary, the system can also square or deskew the medium to be imaged as it is loaded onto the medium support surface.

Particularly advantageous to the present invention is the capability of the system to punch and/or notch the medium of varying widths and in various configurations. The system can also provide for accurate perforating of media of differing widths and in differing configurations prior to imaging, in conjunction with the ensured registration.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. An imaging system for imaging media supported at an imaging position on a support surface, comprising:

a loading device configured to move a medium to be imaged along the support surface to the imaging position;

a perforation mechanism configured to perforate the medium to be imaged with the medium supported on the support surface; and a drive mechanism configured to move the perforation mechanism to any of multiple positions along the supported medium;

wherein the perforation mechanism is further configured to perforate the supported medium after movement to one of the multiple positions.

2. The imaging system according to claim 1, further comprising:

a medium securing device configured to secure the medium to be imaged to the support surface;

wherein the perforation mechanism is further configured to perforate the medium with the medium secured by the medium securing device.

3. The imaging system according to claim 2, wherein:

the medium securing device is a vacuum system configured to apply a vacuum to hold the medium in place.

4. The imaging system according to claim 1, wherein the perforation mechanism is further configured to perforate the medium with the medium in the imaging position.

5. The imaging system according to claim 4, wherein the loading device is further configured to move the medium to be imaged such that a leading edge of the medium extends across a width of the medium and substantially perpendicular to a direction of movement of the medium, and further a registration device configured to be contacted by the leading edge of the medium during loading of the medium to position the medium in the imaging position on the support surface.

6. The imaging system according to claim 5, wherein the perforation mechanism has a fixed spacial relationship with respect to the registration device.

7. The imaging system according to claim 5, wherein:

the drive mechanism is further configured to move the registration device to the one position.

8. The imaging system according to claim 5, wherein the drive mechanism is further configured to move the registration device and the perforation mechanism simultaneously.

9. The imaging system according to claim 1, wherein the one position corresponds to a width of the medium to be imaged.

10. The imaging system according to claim 1, wherein the one position corresponds to a perforation configuration.

11. A method for perforating imaging media supported on a support surface, comprising the steps of:

moving a medium to be imaged along the support surface to a support position;

moving a perforator to a position according to a predetermined criteria; and perforating the medium to be imaged with the medium supported on the support surface and the perforator moved to the position.

12. The method according to claim 1, further comprising the step of:

securing the medium to be imaged to the support surface in the support position;

wherein the medium is perforated after being secured to the support surface.

13. The method according to claim 12, wherein:

the securing of the medium to be imaged includes applying a vacuum near the leading edge of the medium.

14. The method according to claim 11, further comprising the steps of:

moving the medium to the imaging position;

wherein the medium is perforated with the medium supported in the imaging position.

15. The method according to claim 14, wherein the medium is moved into contact with a registration device to position the medium in the imaging position.

16. The method according to claim 15, further comprising the step of:

moving the registration device to a position corresponding to a dimension of the medium to be imaged;

wherein the medium is perforated at a location which is fixed in relationship to the position of the registration device.

17. The method according to claim 11, wherein the position is one of a plurality of positions to which the perforator is moveable.

18. The method according to claim 11, wherein the predetermined criteria is based up on a perforation configuration.

19. The method of claim 11, wherein:

the medium to be imaged has a size parameter which is variable; and the predetermined criteria is based upon the size parameter of the medium to be imaged.

20. The method according to claim 11, wherein the perforator is one of a punch or a notcher.

21. An imaging system for imaging media while supported at an imaging position on a support surface, the imaging system including a loading device configured to move a medium to be imaged onto a support surface, the medium to be imaged being loaded such that a leading edge of the medium extends across a width of the medium and substantially perpendicular to a direction of movement of the medium, comprising:

a signal generator for generating a first signal representing a first perforating criteria, and a second signal representing a second perforating criteria;

a perforating device configured to perforate the medium with the medium supported on the support surface; and a drive mechanism configured to move the perforating device responsive to the first signal to a position corresponding to the first perforating criteria and, after perforating the medium, to move the perforating device responsive to the second signal to a position corresponding to the second perforating criteria.

22. An imaging system according to claim 21, further comprising:

an input device for selecting one of a plurality of media of differing widths for imaging;

wherein perforating criteria is the width of the selected media.

23. An imaging system according to claim 21, wherein the first perforating criteria and the second perforating criteria are perforation configurations.

24. A method of forming a printing plate comprising the steps of:

loading an unexposed plate into an imaging position on a media support surface;

clamping the plate to the media support surface;

moving at least one punch to a position determined by a predetermined perforation pattern;

punching a plurality of apertures in the plate according to the predetermined perforation pattern;

recording an image onto the plate;

removing the plate and mounting the plate onto a press cylinder, wherein the press cylinder accepts plates having the predetermined registration pattern.

25. A method according to claim 24, further comprising the step of:

punching more apertures according to another predetermined pattern.

* * * * *